United States Patent Office 3,824,276
Patented July 16, 1974

3,824,276
SUBSTITUTED-2-OXOBUTYRALDEHYDE
BIS(THIOSEMICARBAZONES)
Maxton F. Murray and Harold G. Petering, Kalamazoo, Mich., assignors to The Upjohn Company, Kalamazoo, Mich.
No Drawing. Continuation-in-part of application Ser. No. 265,060, Mar. 14, 1963, which is a continuation of application Ser. No. 121,301, July 3, 1961, both now abandoned. This application Feb. 24, 1966, Ser. No. 529,671
Int. Cl. C07c *159/00*
U.S. Cl. 260—490
5 Claims

ABSTRACT OF THE DISCLOSURE

Compounds of the formula

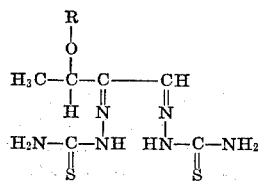

including cuprous, cupric, ferrous, zinc cobaltous and auric chelates, alkali metal and acid addition salts. The compounds have anti-tumor, anti-fungal, and anti-parasitic activity as well as produce symptoms of Vitamin B-complex deficiencies.

---

This application is a continuation-in-part of co-pending application Ser. No. 265,060 filed Mar. 14, 1963, now abandoned, which in turn is a continuation of application Ser. No. 121,301 filed July 3, 1961, now abandoned.

This invention pertains to novel chemical compounds, pharmaceutical compositions thereof, and a process for treatment of pathological conditions and more particularly to the novel chemical compounds of a 3-R-O-2-oxobutyraldehyde bis(thiosemicarbazone) and the salts and metal chelates thereof. 3-R-O-2-oxobutyraldehyde bis(thiosemicarbazone) can be represented by the following structural formula:

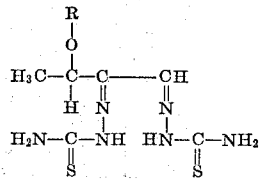

Formula I wherein R is a member selected from the group consisting of hydrogen, methyl and ethyl, propyl, isopropyl, acetyl, propionyl, butyryl and isobutyryl.

In accordance with the invention, it has now been discovered that a compound of the Formula I including their basic salts, metal chelates and acid addition salts, are active as antimetabolites. When fed to adult laboratory rats at the rate of 200 mg./kg. a compound of the Formula I and salts and chelates produce symptoms similar to those observed in B-complex vitamin deficient rats. The livers of these treated rats were depleted of thiamine and pantothenic acid. Hence, when these compounds are administered, alone or in their various pharmaceutical formulations, they produce laboratory animals, for experimental use, deficient in these vitamins.

Further in accordance with the invention, 3-R-O-2-oxobutyraldehyde bis(thiosemicarbazone), including the salts and chelates thereof, has been found to be active against proliferating neoplastic cells. For example, 3-ethoxy-2-oxobutyraldehyde bis (thiosemicarbazone) suppresses proliferation in Hela and Eagle's KB human carcinoma cell cultures at concentrations of about 5–10 γ/ml.; and it and the other compounds of the present invention can be used in the treatment of a surgical field, after excision of a tumor, for inhibiting the growth of any desquamative tumor cells that may seed surrounding tissues or be transported to other parts of the body.

The compounds of this invention are active against certain experimental animal tumors such as Sarcoma 180, Walker 256 carcinosarcoma, Murphy-Sturm lymphosarcoma and Jensen sarcoma.

However, it has been found that the 3-R-O-2-oxobutyraldehyde (bis(thiosemicarbazone) compounds potentiate the action of alkylating agents and ionizing radiations to inhibit growth of proliferating neoplastic cells in vivo and can be used in conjunction with these agents for the treatment of malignant neoplasms. The use of ionizing radiations such as X-rays, beta rays, and gamma rays, and alkylating agents such as nitrogen mustard, triethylene phosphoramide, triethylene thiophosphoramide, 1,4-bis-(methylsulfonyl)butane, 4 - p - [bis(2 - chloroethyl)-amino]-phenyl-butyric acid, 5 - [bis(2 - chloroethyl) amino]-uracil for the treatment of cancers is generally known and practiced; but effective dosages frequently cause some degree of bone marrow damage. In accordance with the invention, it has been found that the effectiveness of the ionizing radiations and the alkylating agents is enhanced, and danger of bone marrow damage is minimized when a 3-R-O-2-oxobutyraldehyle bis(thio-semicarbazone) is administered as a therapeutic adjuvant. It is believed that the antimetabolite action the compound in the chelate form interferes with the metabolism of the tumor cells and predisposes them to the destructive action of the ionizing radiations and alkylating agents. It will be understood, of course, that the invention is not based upon the truth of any particular theory of action, and that other modes of coaction are contemplated. Be that as it may, one inventive embodiment herein provided is a potentiation of the anti-tumor action of ionizing radiations and alkylating agents with concurrent administration of a 3-R-O-2-oxobutyraldehyde bis(thiosemicarbazone) so that efficacy is enhanced and bone marrow damage is minimized.

The potentiating action of 3-ethoxy-2-oxobutyraldehyde bis(thiosemicarbazone) with a typical alkylating agent, 5-[bis(2-chloroethyl)amino]uracil, is demonstrated by the following experiment.

Uniform groups of ten laboratory rats were implanted with Murphy-Sturm lymphosarcoma and subjected to different treatments. Tumor sizes were determined by measurement on the 5th and 15th days after implantation. The group receiving no therapeutic drug developed tumors averaging 10 mm. by the 5th day and 44 mm. by the 15th day. Hence, the increase in size amounted to 34 mm. during the 10-day interval. A similar group of rats which received 25 mg./kg./day of 3-ethoxy-2-oxobutyraldehyde bis(thiosemicarbazone) (orally) during the 5th through 15th days developed tumors averaging 39 mm. A third group which received 50 mg./kg./day (orally) beginning on the 5th day developed tumors measuring 29 mm. by the 15th day. A fourth group treated with 2 mg./kg. of 5-[bis(2-chloroethyl)amino]uracil on the 5th, 8th and 12th days developed tumors averaging 14 mm. by the 15th day (79% inhibition). However, when 25 mg./kg./day (orally) of 3-ethoxy-2-oxobutyraldehyde bis(thiosemicarbazone) was administered on the 5th through 15th days in conjunction with 2 mg./kg. of 5-[bis(2-chloroethyl) amino]uracil (administered orally on the 5th, 8th, and 12th days) the average size of the tumors was actually less at 15 days than at 5 days so inhibition was 100%. Most significantly, four completely regressed tumors were noted. The specific data are presented in the following table:

pp. 177–202 (1941) by substitution of propanol, propionic anhydride, butyric anhydride, and isobutyric anhydride for the methanol, ethanol, isopropanol and acetic anhydride disclosed.

The new compounds, 3-R-O-2-oxobutyraldehyde bis(thiosemicarbazone), (Formula I above), are prepared by reacting 3-R-O-2-oxobutyraldehyde, e.g., 3-hydroxy-2-

TABLE I.—Adjuvant effect of 3-ethoxy-2-oxobutyraldehyde bis(thiosemicarbazone) treatment with 5-[bis(2-chloroethyl)amino]uracil against Murphy-Sturm tumor in rats

| Drug | Dose, mg./kg. | Treatment period, days | Initial B. wt., gms. | Initial Tumor, mm. | T-15 B. wt., gms. | T-15 Tumor, mm. | Δ B. wt., gms. | Δ Tumor, mm. | Percent inhibition | Survivors | Regressions |
|---|---|---|---|---|---|---|---|---|---|---|---|
| None | | | 139 | 10 | 194 | 44 | 55 | 34 | | 9 | 0 |
| A[1] | 25 | T-5 to T-15 | 134 | 9 | 179 | 39 | 45 | 30 | 12 | 10 | 0 |
| A | 50 | T-5 to T-15 | 135 | 10 | 176 | 29 | 41 | 19 | 44 | 10 | 1 |
| B[2] | 2 | T-5, -8, and -12 | 133 | 7 | 141 | 14 | 8 | 7 | 79 | 10 | 1 |
| B | 2 | T-5, -8, and -12 | 134 | 7 | 137 | 5 | 3 | -2 | 100 | 10 | 4 |
| A | 25 | T-5 to T-15 | | | | | | | | | |
| B | 2 | T-5, -8, and -12 | 138 | 9 | 136 | 8 | -2 | -1 | 100 | 10 | 4 |
| A | 50 | T-5 to T-15 | | | | | | | | | |

[1] 3-ethoxy-2-oxobutyraldehyde bis(thiosemicarbazone).
[2] 5-[bis(2-chloroethyl)amino]uracil.

In another treatment regimen for therapy, the 3-R-O-2-oxobutyraldehyde bis(thiosemicarbazone) including salts and chelates, is administered, for a period of from 1 to 10 days, preferably 2 to 7 days prior to the anti-cancer treatment with an ionizing radiation or an alkylating agent. According to experimental results so far obtained, the biological action of the compound is cumulative in cells, and there is little or no immediate effect. For example, 3-ethoxy-2-oxobutyraldehyde bis(thiosemicarbazone) has no effect on Hela, KB, or Walker tumor cell cultures if exposure of the cells is restricted to a short period of time, e.g., 1 to 2 hours even at extremely high concentrations, e.g., 400–800 γ/ml. But prolonged exposure, e.g., 2 to 3 days produces marked inhibition at very low concentrations, e.g., 5 to 10 γ/ml.

It will be clear from the foregoing remarks that the therapeutic activity of a 3-R-O-2-oxobutyraldehyde bis(thiosemicarbazone) is evoked by contacting it with the neoplastic cells to be controlled. The desired contact and therapeutic action can be accomplished by infusing the compound into the milieu containing the organisms or malignant cells. Hence, for example, in the treatment of a surgical field after excision of a tumor, or for other topical applications the 3-R-O-2-oxobutyraldehyde bis(thiosemicarbazone) or its salts of pharmaceutically acceptable acids or chelates, is applied to the cut surfaces and adjoining tissues so that the compound becomes dispersed throughout tissue exudates and thus contacts the malignant cells over a period of from 2 to 10 days. Likewise, for use as an adjuvant in radiation therapy the compounds or their salts or chelates, can be administered in suitable dosage form.

Moreover, it has been discovered that the 3-R-O-2-oxobutyraldehyde bis(thiosemicarbazone), salts and chelates are active against monocellular organisms, illustratively, parasitic *Protozoa*, for example, *Trichomonads*. Thus it has been found that the compounds of this invention can be used to control trichomonal infections in mammals. The copper and zinc chelates each at a concentration of 1 mg./ml. have shown inhibition of growth of *B. subtilis, S. aureus, M. avium, K. pneumonia,* and *S. lutea*.

The starting materials for preparing 3-R-O-2-oxobutyraldehyde bis(thiosemicarbazone) are thiosemicarbazide and a 3-R-O-2-oxobutyraldehyde, wherein R is a member selected from the group consisting of hydrogen, methyl, ethyl, propyl, isopropyl, acetyl, propionyl, butyryl and isobutyryl. Some of the starting aldehydes are known and the others can be prepared by known means, e.g., the method of L. Rappen, *J. Prakt. Chem.* Vol. 157, oxobutyraldehyde, 3 - methoxy - 2 - oxobutyraldehyde, 3-ethoxy - 2 - oxobutyraldehyde, 3-propoxy-2-oxobutyraldehyde, 3-isopropoxy-2-oxobutyraldehyde, 3-acetoxy-2-oxobutyraldehyde, 3 - propionyloxy - 2 - oxobutyraldehyde, 3-butyryloxy - 2 - oxobutyraldehyde, and 3-isobutyryloxy-2-oxobutyraldehyde, with thiosemicarbazide in the presence of an inert solvent medium. Preferably, the molar ratio of thiosemicarbazide to aldehyde is at least 2:1. Suitable inert solvent media include water, water acidified with weak acids, e.g., acetic acid (preferred), dimethylformamide, ethanol, and the like, including mixtures thereof. The 3-R-O-2-oxobutyraldehyde bis(thiosemicarbazone) is recovered by conventional procedures, e.g., by removing the solvent medium, washing and drying, and recrystallizing if so desired. Basic salts are prepared by neutralizing the 3-R-O-2-oxobutyraldehyde bis(thiosemicarbazone) with, for example, alkali metal alkoxides such as sodium methoxide, potassium ethoxide, and the like carried out under anhydrous conditions in alcoholic media, e.g., methanol, ethanol, and the like.

The metal chelates are prepared by dissolving a 3-R-O-2-oxobutyraldehyde bis(thiosemicarbazone) in inert solvent (methanol preferred) and adding a soluble metal salt dissolved in like solvent to form the chelate. Although the 3-R-O-2-oxobutyraldehyde bis(thiosemicarbazone) compounds will form chelates with many metals, for inhibiting the growth of proliferating neoplastic cells and treating the hosts of malignant neoplasms the chelates of cuprous, cupric, zinc, ferrous, cobaltous, and auric are used. The cupric chelate is preferred.

Acid addition salts can be prepared from the chelates of the compound of the Formula I by neutralization with an appropriate amount of an inorganic or organic acid, examples of which are hydrochloric, hydrobromic, sulfuric, nitric, phosphoric, acetic, lactic, benzoic, glycolic, succinic, tartaric, maleic, malic pamoic, citric, and the like. The neutralization can be carried out by a variety of procedures known in the art to be generally useful for the preparation of amine acid addition salts.

The metal chelates have the additional utility for use as fungistats an fungicides (depending upon concentration, susceptibility, and the like) for inhibiting the growth and killing of fungal organisms such as *Nocardia asteroides, Geotrichum* sp., *Phialophora verrucosa,* and *Trichophyton rubrum*.

For oral administration, the 3-R-O-2-oxobutyraldehyde bis(thiosemicarbazone), including the salts and chelates can be formulated with a pharmaceutical carrier to give solid or fluid unit dosage forms. Suitable solid forms include tablets, pills, capsules, granules, powders, cachets, and the like. Advantageously, the pharmaceutical carrier for such solid forms include corn starch, lactose, dicalcium phosphate, terra alba (calcium sulfate), talc, stearic acid, magnesium stearate, and gums. Suitable fluid forms include solutions, suspensions, syrups, and emulsions. Advantageously, the pharmaceutical carrier for such fluid forms comprise water, oils, and water-oil emulsions. If desired, suitable dispersing or suspending agents can be included, for example, polysorbate 80, tragacanth, acacia, agar, lecithin, dextran, sodium carboxymethylcellulose, methylcellulose, polyvinylpyrrolidone, gelatin, and mixtures thereof. Suitable oils for solutions and water-oil emulsions include cotton-seed oil, sesame oil, coconut oil, and peanut oil.

Advantageously, compositions for oral administration comprising a 3-R-O-2-oxobutyraldehyde bis(thiosemicarbazone) and a pharmaceutical carrier include in the composition a water soluble salt of a chelating metal, e.g., cupric, cuprous, ferrous zinc, cobaltous, and auric. When included in the compositions, the metal salts are present in a molar ratio of 0.1 to 1 mole of salt to 1 mole of the 3-R-O-2-oxobutyraldehyde bis(thiosemicarbazone) and a ratio of 0.2 to 0.4 mole of salt to 1 mole is preferred. Equally effective is the inclusion of salts of a plurality of suitable metals, the total molar amounts of the salts falling within the range of the above ratio. By including a plurality of salts it is possible to obtain a therapeutic effect equal to that obtainable had but a single salt been included and obtain the advantage of reducing any potential toxicity due to the metal ion. Suitable salts are, for example, zinc acetate, cupric acetate, cupric sulfate, cupric chloride, cuprous chloride, zinc sulfate, cobaltous chloride, ferrous sulfate and auric chloride.

For parenteral administration, 3-R-O-2-oxobutyraldehyde bis(thiosemicarbazone) including salts and chelates, and acid addition salts can be formulated in dilute aqueous suspensions, aqueous solutions, and oil dispersions in unit dosage form for intramuscular injection, intravenous drip, vascular perfusion, or like routes. Advantageously, a solubilizer, for example, N,N-dimethylacetamide (preferred), ethanol, and the like can be utilized. If desired, other aqueous media such as Water for Injection, normal Saline Solution, Ringer's Solution, Blood Plasma, and Whole Blood can be used.

Compositions of 3-R-O-2-oxobutyraldehyde bis(thiosemicarbazone) including salts, chelates and acid addition salts for local and topical applications, for example to a surgical field, intravaginally, intraurethrally, and like applications include powders, aerosols, ointments, creams, lotions, pastes, jellies, suppositories and the like. Such compositions of the essential active ingredient can include emulsifying agents, solvents, antioxidants, preservatives, buffers, and bodying materials.

For the treatment of domestic birds and animals by oral administration, the 3-R-O-2-oxobutyraldehyde bis(thiosemicarbazone) including salts, chelates, and acid addition salts is conveniently prepared in the form of a food premix. The food premix can comprise the 3-R-O-2-oxobutyraldehyde bis(thiosemicarbazone) in admixture with an edible pharmaceutical diluent of the type previously mentioned such as starch, oatmeal, flour, calcium carbonate, talc, dried fish meal and the like non-toxic, orally acceptable pharmaceutical diluents. The prepared premix is then conveniently added to the regular feed, thereby providing medication to the animal or bird in the course of feeding.

The term "unit dosage form" as used in the specification and claims refers to physically discrete units suitable as unitary dosages for animals, each unit containing a predetermined quantity of active material calculated to produce the desired therapeutic effect in association with the required pharmaceutical diluent, carrier or vehicle. The specification for the novel unit dosage forms of this invention are directly dependent on (a) the unique characteristics of the active material and the particular therapeutic effect to be achieved, and (b) the limitations inherent in the art of compounding such an active material for therapeutic use in animals, as disclosed in detail in this specification, these being features of the present invention. Examples of suitable unit dosage forms in accord with this invention are tablets, capsules, suppositories, powder packets, granules, pills, teaspoonfuls, segregated multiples of any of the foregoing, and other forms as herein described. The compositions of the present invention comprise in unit dosage form, from about 15 mg. to about 1 gm. of a 3-R-O-2-oxobutyraldehyde bis(thiosemicarbazone), including salts, chelates, and acid addition salts in association with a pharmaceutical carrier.

The dosage of 3-R-O-2-oxobutyraldehyde bis (thiosemicarbazone) including salts, chelates, and acid addition salts, depends upon the route of administration, the circumstances of treatment (e.g., severity of disease, adjuvant therapy, and length of treatment), as well as the subjects age, weight, and general physical condition. In general, a total daily dosage of from 0.1 to 15 mg./kg. is effective. Preferred is from about 1 about 5 mg./kg./day. The lower dosages can be followed for chronic administration and the higher dosages for acute. Single daily, divided daily, or intermittent schedules can be employed. For surgical field treatment and other local and topical applications, formulations containing 0.5 to 25% of the active material, and preferably 2–5%, can be used. Higher concentrations than 25% can be used for some local applications. In adjuvant therapy the usual dosage of ionizing radiation or alkylating agent can be halved or quatered when combined treatment with a 3-R-O-2-oxobutyraldehyde bis(thiosemicarbazone) is carried out.

The compositions described hereinbefore can include supplementary active ingredients which extend the usefulness of the essential active ingredient or accelerate the desired clinical response to therapy. Of particular interest in this regard are antibiotics such as tetracycline, actinomycin C and D, chlortetracyclne, penicillin, novobiocin, neomycin and the like in compositions for surgical field treatment; antimonilial agents such as nystatin, amphotericin B, trichomycin and the like in compositions for antitrichomonal use; hormones, such as diethylstilbesterol, progesterone, medroxyprogesterone and estradiol; fluoxymesterone, methyltestosterone, and testosterone; and particularly alkyalting agents such as busulfan, chlorambucil, cyclophosphamide, mechlorethamine hydrochloride, thio-Tepa, triethylene melamine and 5-[bis(2-chloroethyl) amino]uracil.

The administration of the compositions of the present invention provides the veterinarian with a method for treating malignantly proliferating neoplasms such as carcinomas, lymphomas and sarcomas, and trichomonal and fungal infections.

The non-chelate compositions provide a useful tool to the pharmacologist by supplying a means for artificially inducing an essential mineral deficiency condition in experimental animals, particularly copper, zinc and cobalt deficiencies.

The following examples describe some preferred forms and practices of this invention, but they are not to be construed as limiting the scope thereof.

EXAMPLE 1.—Preparation of 3-ethoxy-2-oxobutylaldehyde bis(thiosemicarbazone) and disodium salt thereof

*Part A.* Preparation of 3-ethoxy-2-oxobutyraldehyde bis(thiosemicarbazone)

A solution of 13.6 gm. (0.15 mole) of thiosemicarbazide in 500 ml. of water at a temperature of about 45° C. was mixed an aqueous solution prepared by dissolving 7.4 gm. (0.05 mole) of 3-ethoxy-2-oxobutyraldehyde monohydrate in 25 ml. of water. After stirring for one hour, a gummy precipitate separated, and during the second hour of stirring white crystals began to form; stirring was continued for a total of 5 hours. The crystals were then recovered on a filter, washed with hot water, and dried at 50° C. under reduced pressure. They were dissolved in 400 ml. of boiling ethanol, and this solution was cooled to about 25° C. The long, yellow-tan needles of 3-ethoxy-2-oxo-butyraldehyde bis(thiosemicarbazone) that separated were recovered on a filter, washed with 10 ml. of 50% aqueous ethanol, and dried at 55° C. under reduced pressure; m.p. 204° to 206° C.

*Anal.* Calcd. for $C_8H_{16}N_6OS_2$: C, 34.76; H, 5.84; S, 23.20. Found: C, 35.44; H, 5.56; S, 23.49.

*Part B.* Preparation of disodium salt of 3-ethoxy-2-oxo-butyraldehyde bis(thiosemicarbazone)

A solution of 276 mg. (1 millimole) of 3-ethoxy-2-oxobutyraldehyde bis(thiosemicarbazone) in 1.5 ml. of dimethylacetamide was mixed with a solution of 130 mg. (2.4 millimoles) of sodium methoxide in 5 ml. of absolute methanol. The resulting orange-colored solution was diluted with 100 ml. of diethylether and the sodium salt of 3-ethoxy-2-oxobutyraldehyde bis(thiosemicarbazone) precipitated. It was recovered on a filter, washed with ether and dried to give 275 mg. (90% yield) of disodium 3-ethoxy - 2 - oxobutyraldehyde bis(thiosemicarbazone).

*Anal.* Calcd. for $C_8H_{14}N_6Na_2OS_2$: Na, 14.35. Found: Na, 13.8.

EXAMPLE 2.—Preparation of 3-ethoxy-2-oxobutyraldehyde bis(thiosemicarbazone)

A solution of 25.5 gm. (0.28 mole) of thiosemicarbazide in 2100 ml. of water was mixed at a temperature of about 25° C. with an aqueous solution of 20.7 gm. (0.14 mole) of 3-ethoxy-2-oxo-butyraldehyde monohydrate in 300 ml. of water. After thorough mixing, the reaction mixture was held at about 25° C. for 17 hrs. during which time a solid precipitate settled in the bottom of the flask. The solid cake was broken up and the mixture was held at 4° C. for 2 hrs. The crude product was recovered on a coarse sintered-glass filter. It was dissolved in 1200 ml. of boiling absolute methanol, and while still hot, 1200 ml. of water was added. After reheating to near boiling, the solution was filtered and the filtrate was stored at about 25° C. for 20 hours during which time yellow crystals formed. The suspension of crystals was further refrigerated overnight at 4° C. and filtered. The filter cake was washed with three 200-ml. portions of water and dried by suction. There was thus obtained 23.1 gm. (60% of theory) of 3-ethoxy-2-oxobutyraldehyde bis(thiosemicarbazone) melting at 205° C. to 208° C.

EXAMPLE 3.—Preparation of 3-methoxy-2-oxobutyraldehyde bis(thiosemicarbazone)

A 1.42 grams of 3-methoxy-2-ketobutyraldehyde-sodium bisulfite complex

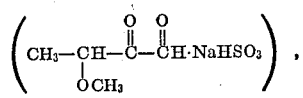

0.0065 mole, was dissolved in 25 ml. of water to which 2 ml. of acetic acid had been added. The solution was heated to 65° C. for 15 minutes and nitrogen passed therethrough to remove sulfur dioxide. To this solution was added 1.5 gm. of thiosemicarbazide (0.0165 mole) dissolved in 25 ml. of water at 60° C. The mixture was held at 60° C. for thirty minutes, allowed to cool to room temperature, and held at room temperature for sixteen hours. The crystalline mass was removed on a filter and washed with 20 ml. of cold water followed by a wash of 20 ml. of 10% methanol in ether. The crystals were air dried and yielded 1.09 gm. (65% of theory) of 3-methoxy-2-oxobutyraldehyde bis(thiosemicarbazone). The ether washes were saved.

B 1.37 grams of a 58% w./v. solution of 3-methoxy-2-ketobutyraldehyde (0.0058 mole) was added to 20 ml. of 10% ethanol and this, in turn, added to 25 ml. of water containing 1.1 gm. of thiosemicarbazide (0.012 mole). The reaction was carried out at 60° C. at which temperature the mixture was maintained for 30 minutes. The mixture was allowed to cool to room temperature and stood for sixteen hours. The crystals were removed on a filter and washed with 20 ml. of water followed by a wash of 20 ml. of 10% ethanol in ether. The crystals were air dried and yielded 0.54 gm. (34% of theory) of 3-methoxy - 2 - oxobutyraldehyde bis(thiosemicarbazone). The ether washes were saved.

The ether washes of parts A and B were combined and evaporated to dryness to provide 300 mg. of 3-methoxy-2-oxo-butyraldehyde bis(thiosemicarbazone).

D

To recrystallize, 0.97 gm. from part A, 0.42 gm. from part B, and 0.25 gm. from part C were dissolved in 80 ml. of boiling methanol, the solution filtered and the filtrate mixed with 80 ml. of water. The mixture was kept at room temperature for 16 hours and then refrigerated (about 5° C.) for 24 hours. The crystals were removed on a filter and washed with 20 ml. of water, followed by a wash of 20 ml. of 10% ethanol in ether. The crystals were dried at 50° C. for three hours to provide 1.71 gm. of 3-methoxy-2-oxobutyraldehyde bis(thiosemicarbazone) (72% of theory) with a melting range of 208 to 212° C. An additional 0.26 gm. was obtained from the mother liquor.

*Anal.* Calcd. for $C_7H_{14}N_6OS_2$: C, 32.05; H, 5.35; N, 32.05; S, 24.45. Found: C, 32.78; H, 5.49; N, 31.35; S, 24.13.

I.R. spectral analysis indicated that the proposed groups were present.

EXAMPLE 4.—Preparation of 3-hydroxy-2-oxobutyraldehyde bis(thiosemicarbazone)

4.12 grams of 3-hydroxy-2-ketobutyraldehyde (0.04 mole) were dissolved in 20 cc. of 50% v./v. ethanol and the solution added dropwise to 130 cc. of a 5% w./v. acetic acid solution at 50° C. containing 7.3 gm. of thiosemicarbazide. The color of the solution became a deep yellow and thereafter yellow crystals began to appear. The reaction mixture was stirred at 50° C. until all of the keto-aldehyde solution had been added and then the mixture allowed to cool to room temperature slowly with stirring. After five days at room temperature the crystals were recovered on a filter and washed successively with 50 ml. of cold water, 50 ml. of ethanol, 50 ml. of ether, and air dried at room temperature.

A yield of 8.0 gm. of 3-hydroxy-2-oxobutyraldehyde bis(thiosemicarbazone) was obtained (80% of theory).

EXAMPLE 5.—3-ethoxy-2-oxobutyraldehyde bis(thiosemicarbazone)

The following example is a modification of the preceding examples providing higher yield and a purer product by means of introducing acetic acid in the reaction media.

33 grams of thiosemicarbazide (0.363 mole) was dissolved in 650 ml. of water and 20 ml. of glacial acetic acid at 60° C. The solution was filtered and to it added dropwise, at 60° C. and a rate of 1 drop per second, with vigorous stirring, 25.8 gm. (0.174 mole) of 3-ethoxy-2-oxobutyraldehyde hydrate as a 30.7% aqueous solution. Heating and stirring were maintained for 30 minutes following the addition and then the reaction mixture allowed to cool to room temperature and stirred for about 20 hours. The crystals which formed were removed by filtration and washed successively with 250 ml. water, 250 ml. ethanol, 250 ml. ether, and air dried to provide 82 gm. of 3-ethoxy-2-oxobutyraldehyde bis(thiosemicarbazone) (85% yield).

EXAMPLE 6.—3-propoxy-2-oxobutyraldehyde bis(thiosemicarbazone)

5.76 grams (0.04 mole) of 3-propoxy-2-ketobutyraldehyde are dissolved in 20 cc. of 50% v./v. ethanol and the solution added dropwise to 130 cc. of a 5% w./v. acetic acid solution at 50° C. containing 7.3 gm. of thiosemicarbazide. The reaction mixture is stirred at 50° C. until all of the keto-aldehyde solution is added and then the mixture allowed to cool to room temperature slowly with stirring. Crystals of 3-propoxy-2-oxobutyraldehyde form and are recovered on a filter and washed successively with 50 ml. of cold water, 50 ml. ethanol, 50 ml. ether and air dried.

EXAMPLE 7.—3-isopropoxy-2-oxobutyraldehyde bis(thiosemicarbazone)

Following the procedure of the preceding Example 6, substituting 5.76 gm. of 3-isopropoxy-2-ketobutyraldehyde for the 3-propoxy-2-ketobutyraldehyde of the example, 3-isopropoxy-2-oxobutyraldehyde bis(thiosemicarbazone) is prepared.

EXAMPLE 8

Following the procedure of the preceding Example 1, part B, the disodium salts of 3-methoxy-2-oxobutyraldehyde bis(thiosemicarbazone), 3-propoxy-2-oxobutyraldehyde bis (thiosemicarbazone), 3-isopropoxy-2-oxobutyraldehyde bis(thiosemicarbazone) and 3-hydroxy-2-oxobutyraldehyde bis(thiosemicarbazone) can be prepared by substituting equimolar amounts of the respective compounds for the 3-ethoxy compound of the example.

Similarly the dipotassium salts can be prepared by substituting an equimolar amount of potassium methoxide for the sodium methoxide of the example.

EXAMPLE 9.—3-acetoxy-2-oxobutyraldehyde bis(thiosemicarbazone)

In a liter flask equipped with stirrer, thermometer, and reflux condenser, 14.7 gm. of thiosemicarbazide was dissolved in 245 ml. of water and 25 ml. of acetic acid added thereto. 9.2 grams of 3-acetoxy-2-ketobutyraldehyde dissolved in 50 ml. of warm water was added to the flask. The solution was stirred while maintaining the flask on a 55° C. water bath for 8 hours. (Crystals began forming after 1–2 hours.) The reaction mixture was cooled on an ice bath and the crystals recovered on a filter, washed with 200 ml. of cold water, and dried.

The crystals were dissolved in 1.5 liters of methanol, heated to the boiling point, and 1.5 liters of hot water added thereto. Crystals did not form after the addition of water, and cooling the solution did not produce crystals. The solution was concentrated to about 1 liter, cooled, and crystals recovered on a filter and dried in vacuo at 100° C.

11.2 grams (60.5% theory) of 3-acetoxy-2-oxobutyraldehyde bis(thiosemicarbazone) were obtained having a m.p. 210.3–212.1° C.

*Anal.* Calcd. for $C_8H_{14}N_6O_2S_2$: C, 33.09; H, 4.86; N, 28.95; S, 22.09. Found: C, 33.34; H, 4.85; N, 28.18; S, 22.17.

The sodium and potassium salts of the 3-acetoxy compound are prepared according to Example 1, part B, and Example 8.

EXAMPLE 10

A

Following the procedure of the preceding Example 9, substitute an equimolar amount of 3-propionoxy-2-ketobutyraldehyde for the 3-acetoxy-2-ketobutyraldehyde of the example; 3-propionoxy-2-oxobutyraldehyde bis(thiosemicarbazone) is prepared.

B

Following the procedure of the preceding Example 9, substitute an equimolar amount of 3-butyryloxy-2-ketobutyraldehyde for the 3-acetoxy-2-ketobutyraldehyde of the example; 3-butyryloxy - 2-oxobutyraldehyde bis(thiosemicarbazone) is prepared.

C

Following the procedure of the preceding Example 9, substitute an equimolar amount of 3 - isobutyryloxy-2-ketobutyraldehyde for the 3-acetoxy-2-ketobutyraldehyde of the example; 3-isobutyryloxy-2-oxobutyraldehyde bis-(thiosemicarbazone) is prepared.

D

The sodium and potassium salts of the compounds prepared in A, B, and C above are prepared according to Example 1, part B, and Example 8.

EXAMPLE 11.—Zinc chelate of 3-ethoxy-2-oxobutyraldehyde bis(thiosemicarbazone)

4.4 grams (0.016 mole) of 3-ethoxy-2-oxobutyraldehyde bis(thiosemicarbazone) was dissolved in 90 ml. of boiling methanol. 3.5 grams (0.016 mole) of zinc acetate·2H$_2$O was dissolved in 40 ml. of warm methanol. The two solutions were combined and an orange color formed immediately. The mixture was then concentrated to a thick sludge at 45° C. After cooling, 200 ml. of ether was added which caused the sludge to solidify. The solid was washed with 40 ml. of ether and air dried to provide 3.87 gm. of chelate.

The mother liquor and ether washes were combined, concentrated, washed and dried as in the preceding paragraph to provide an additional 2.16 gm. of chelate.

The UV spectra of both crops were similar. The crops were combined to give a total yield of 6.03 gm. Elemental analysis indicated the compound was obtained as the mono-acetate, therefore a 94% yield.

*Anal.* Calcd. for $C_{10}H_{17}N_6O_3S_2Zn$ (MW 398.5): C, 30.1; H, 4.3; N, 21.1; S, 16.1; Zn, 16.4. Found: C, 30.0; H, 5.0; N, 20.4; S, 15.5; Zn, 17.7.

In similar manner the zinc chelates are prepared substituting equimolar amounts of 3-methoxy-2-oxobutyraldehyde bis(thiosemicarbazone),
3-propoxy-2-oxobutyraldehyde bis(thiosemicarbazone),
3-isopropoxy-2-oxobutyraldehyde bis(thiosemicarbazone),
3-hydroxy-2-oxobutyraldehyde bis(thiosemicarbazone),
3-acetoxy-2-oxobutyraldehyde bis(thiosemicarbazone),
3-propionoxy-2-oxobutyraldehyde bis(thiosemicarbazone),
3-butyryloxy-2-oxobutyraldehyde bis(thiosemicarbazone), and
3-isobutyryloxy-2-oxobutyraldehyde bis(thiosemicarbazone)

for the 3-ethoxy-2-oxobutyraldehyde bis (thiosemicarbazone) of the example.

EXAMPLE 12.—Cupric chelate of 3-ethoxy-2-oxobutyraldehyde bis(thiosemicarbazone)

4.4 grams (0.016 mole) of 3-ethoxy-2-oxobutyraldehyde bis(thiosemicarbazone) was suspended in 100 ml. 95% ethanol. 3.2 grams (0.016 mole) cupric acetate·H$_2$O was suspended in 100 ml. 95% ethanol and the two solutions then combined. The resulting black solution was then heated to boiling. Because all solids were not in solution, the insoluble portion was centrifuged off and dissolved in an additional 100 ml. 95% ethanol. A small amount of insoluble material was discarded. The ethanol solutions were combined and allowed to stand at room temperature for 24 hours.

The dark brown solid obtained was filtered off, washed with some each of cold ethanol and ether and dried, first in vacuo then at 66° C. for 5 minutes. The yield was 3.47 gm.

The mother liquor and all washes were concentrated to dryness, scraped out and dried at 66° C. for 6 hours. Another 1.73 gm. was obtained for a total yield of 5.2 gm.

Elemental analysis indicates this compound to be the copper chelate of the free base. On this basis the theoretical yield should be 5.4 gm. and our total yield was 96%.

*Anal.* Calcd. for $C_8H_{14}N_6OS_2Cu$ (MW 337.7): C, 28.4; H, 4.1; N, 24.9; S, 19.0; Cu, 18.8. Found: C, 28.8; H, 4.4; N, 23.7; S, 19.5; Cu, 19.0

In similar manner the cupric chelates are prepared substituting equimolar amounts of 3-methoxy-2-oxobutyraldehyde bis(thiosemicarbazone), 3-propoxy-2-oxobutyraldehyde bis(thiosemicarbazone), 3-isopropoxy-2-oxobutyraldehyde bis(thiosemicarbazone), 3-hydroxy-2-oxobutyraldehyde bis(thiosemicarbazone), 3-acetoxy-2-oxobutyraldehyde bis(thiosemicarbazone), 3 - propionoxy - 2-oxobutyraldehyde bis(thiosemicarbazone), and 3-isobutyrylbutyraldehyde bis(thiosemicarbazone), 3 - butyryloxy-2-oxobutyraldehyde bis(thiosemicarbazone), and 3-iso-butyryloxy - 2 - oxobutyraldehyde bis(thiosemicarbazone) for the 3-ethoxy - 2 - oxobutyraldehyde bis(thiosemicarbazone) of the example.

EXAMPLE 13.—Cuprous chelate of 3-ethoxy-2-oxobutyraldehyde bis(thiosemicarbazone)

1.1 grams (0.004 mole) of 3-ethoxy-2-oxobutyraldehyde bis(thiosemicarbazone) was dissolved in 40 ml. of boiling methanol. 800 mg. (0.008 mole) of cuprous chloride was dissolved in 40 ml. of 50% ethanol with sufficient hydrochloric acid added dropwise to cause solution. The two solutions were combined and heated to 80–90° C. on a steam bath for 5–10 minutes, cooled to room temperature, and refrigerated at 5° C. for two hours. The crystals which formed were removed by centrifuge, washed with 20 ml. each of water, ethanol, and ether, and air dried to provide a yield of 1.56 gm. of the cuprous chelate of 3-ethoxy-2-oxobutyraldehyde bis(thiosemicarbazone).

The cuprous crystals were light brown in contrast to the reddish brown crystals of the cupric chelate of Example 12.

In similar manner the cuprous chelates can be prepared substituting equimolar amounts of 3-methoxy-2-oxobutyraldehyde bis(thiosemicarbazone), 3-propoxy-2-oxobutyraldehyde bis(thiosemicarbazone), 3-isopropoxy-2-oxobutyraldehyde bis(thiosemicarbazone), 3-hydroxy-2-oxobutyraldehyde bis(thiosemicarbazone), 3-acetoxy-2-oxobutyraldehyde bis(thiosemicarbazone), 3-propionoxy - 2 - oxobutyraldehyde bis(thiosemicarbazone), 3-butyryloxy-2-oxobutyraldehyde bis(thiosemicarbazone), and 3-isobutyryloxy-2-oxobutyraldehyde bis(thiosemicarbazone), for the 3-ethoxy-2-oxobutyraldehyde bis(thiosemicarbazone) of the example.

EXAMPLE 14.—Cupric chelate of 3-ethoxy-2-oxobutyraldehyde bis(thiosemicarbazone)dihydrochloride 2.76 g. of 3-ethoxy-2-oxobutyraldehyde bis(thiosemicarbazone) was dissolved in 70 ml. of hot methanol. To this was added rapidly with stirring 15 ml. of a methanolic solution containing 1.71 g. (0.01 mole) of cupric chloride ($CuCl_2 \cdot 2H_2O$) and 3 ml. of concentrated hydrochloric acid (0.036 moles). The yellow solution of 3-ethoxy - 2 - oxobutyraldehyde bis(thiosemicarbazone) turned a deep green as the cupric chelate of 3-ethoxy-2-oxobutyraldehyde bis(thiosemicarbazone)dihydrochloride was formed. The mixture was allowed to cool to 40° C. at which time a light greenish precipitate impurity was removed by centrifugation. The clarified solution was then cooled to room temperature and diluted with four volumes of diethyl ether. After standing for twenty-four hours in the refrigerator, the deep green crystalline dihydrochloride was removed by filtration, washed with ether, and dried to provide 3.5 g. of the cupric chelate of 3-ethoxy - 2-oxobutyraldehyde bis(thiosemicarbazone)dihydrochloride (85% of theory).

In similar manner the dihydrochloride-cupric chelates can be prepared substituting equimolar amounts of 3-methoxy-2-oxobutyraldehyde bis(thiosemicarbazone), 3-propoxy - 2-oxobutyraldehyde bis(thiosemicarbazone), 3-isopropoxy - 2-oxobutyraldehyde bis(thiosemicarbazone), 3-acetoxy-2-oxobutyraldehyde bis(thiosemicarbazone), 3-propionoxy-2-oxobutyraldehyde bis(thiosemicarbazone), 3-butyryloxy-2-oxobutyraldehyde bis(thiosemicarbazone) and 3-isobutyryloxy-2-oxobutyraldehyde bis(thiosemicarbazone), for the 3-ethoxy-2-oxobutyraldehyde bis(thiosemicarbazone) of the example.

EXAMPLE 15.—Tablet composition

Ten thousand (10,000) tablets for oral use, each containing 100 mg. of 3 - ethoxy - 2 - oxobutyraldehyde bis-(thiosemicarbazone) and 0.5 mg. of 5-[bis(2-chloroethyl)amino]uracil was prepared from the following ingredients:

|  | Gm. |
|---|---|
| 3 - ethoxy - 2 - oxobutyraldehyde bis(thiosemicarbazone) | 1000 |
| 5-[bis(2-chloroethyl)amino]uracil | 5 |
| Lactose | 1250 |
| Talc | 300 |

The powdered materials were thoroughly mixed and granulated by slugging. The granules were mixed with a lubricant mixture of 100 gm. of bolted starch and 20 gm. of calcium stearate and then compressed into tablets. These tablets are suitable for clinical use, preferably administered at the rate of one tablet daily.

EXAMPLE 16.—Hard-gelatin capsule composition

Ten thousand two-piece hard-gelatin capsules for oral use, each capsule containing 75 mg. of 3-ethoxy-2-oxobutyraldehyde bis(thiosemicarbazone) was prepared from the following ingredients:

|  | Gm. |
|---|---|
| 3 - ethoxy - 2-oxobutyraldehyde bis(thiosemicarbazone) | 750 |
| Cornstarch | 1600 |
| Light mineral oil | 130 |
| Magnesium stearate, powder | 160 |
| Talc | 160 |

The powdered ingredients were thoroughly mixed and encapsulated in the usual manner. The resulting capsules can be administered clinically at the rate of one capsule daily.

Substitution of 150 gm. of active ingredient for the 750 gm. above yields capsules each containing 15 mg. thereof which can be administered at the rate of one capsule four times daily.

EXAMPLE 17.—Soft-elastic capsule composition

Ten thousand soft-elastic capsules for oral use, each containing 225 mg. of 3-ethoxy-2-oxobutyraldehyde bis (thiosemicarbazone) was prepared by dispersing 2250 gm. of the 3-ethoxy-2-oxobutyraldehyde bis(thiosemicarbazone) in sufficient corn oil to render the drug capsulatable and thereafter forming soft-elastic capsules in the usual manner. One capsule daily achieves an effective dosage schedule.

Substitution of 10,000 gm. of the active ingredient for the 2250 gm. above gives capsules each containing 1000 mg. thereof which can be administered on a schedule of one capsule daily.

EXAMPLE 18.—Aqueous suspension

Ten liters of an aqueous suspension for oral use containing 15 mg. of 3-ethoxy-2-oxobutyraldehyde bis(thiosemicarbazone) per 5 ml. of suspension was prepared by thoroughly mixing the following ingredients:

| | Gm. |
|---|---|
| 3 - ethoxy - 2 - oxobutyraldehyde bis(thiosemicarbazone) | 30 |
| Methylparaben | 7.5 |
| Propylparaben | 2.5 |
| Saccharin sodium | 12.5 |
| Cyclamate sodium | 2.5 |
| Glycerin | 3000 |
| Tragacanth powder | 10 |
| Orange oil flavor | 10 |
| F.D. and C. orange dye | 7.5 |
| Deionized water, q.s. 10,000 ml. | |

The suspension prepared as above is suitable for clinical use and can be administered at the rate of 1 teaspoonful (5 ml.) 3 times daily.

EXAMPLE 19.—Capsule composition

Ten thousand hard gelatin capsules, each containing 125 mg. of 3-ethoxy-2-oxobutyraldehyde bis(thiosemicarbazone) and 250,000 units of nystatin, were prepared from the following:

| | Gm. |
|---|---|
| 3 - ethoxy - 2 - oxobutyraldehyde bis(thiosemicarbazone) | 1250 |
| Nystatin (2000 units/mg.) | 1250 |
| White mineral oil | 65 |
| Magnesium stearate, powdered | 65 |
| Talc | 65 |

The ingredients are thoroughly mixed and capsulated in the usual manner. The capsules can be administered at the rate of one capsule three times daily.

EXAMPLE 20.—Sterile powder (for local use)

A 5000 gm. quantity of sterile powder for local use in a surgical field, or for topical application, is prepared from the following ingredients:

| | Gm. |
|---|---|
| 3 - ethoxy - 2 - oxobutyraldehyde bis(thiosemicarbazone), fine powder | 250 |
| Lactose U.S.P., fine powder | 4750 |

Advantageously, to the above preparation is added 5 gm. of 5-[bis(2-chloroethyl)amino]uracil by replacing an equal amount of the lactose. Alternatively, 10 gm. of 5-[bis(2-chloroethyl)amino]uracil can be added replacing an equal amount of lactose.

EXAMPLE 21.—Jelly

A jelly containing 10 mg. of 3-ethoxy-2-oxobutyraldehyde bis(thiosemicarbazone) per gm. (1% by weight) was prepared by thoroughly mixing together the following ingredients:

| | Gm. |
|---|---|
| 3 - ethoxy - 2 - oxobutyraldehyde bis(thiosemicarbazone) | 10 |
| Polysorbate 80 | 14 |
| Polyethylene glycol 400 | 50 |
| Sodium carboxymethylcellulose, low viscosity | 20 |
| Sodium chloride | 8 |
| Sodium benzoate | 3 |
| Water, q.s. | 1000 |

The resulting jelly is applied topically to a surgical field or affected area, preferably twice daily.

EXAMPLE 22.—Sterile aqueous suspension

A sterile aqueous suspension suitable for intramuscular injection and containing 100 mg. of 3-ethoxy-2-oxobutyraldehyde bis(thiosemicarbazone) in each ml. is prepared from the following ingredients:

| | Gm. |
|---|---|
| 3 - ethoxy - 2 - oxobutyraldehyde bis(thiosemicarbazone) | 100 |
| Polyethylene glycol 400 | 30 |
| Sodium chloride U.S.P. | 9 |
| Myristyl-gamma-picolinium chloride | 0.2 |
| Water, q.s. 1000 ml. | |

EXAMPLE 23.—Oil preparation for I.M. injection

A sterile preparation suitable for intramuscular injection and containing in each ml. 25 mg. of 3-ethoxy-2-oxobutyraldehyde bis(thiosemicarbazone) and 0.5 mg. of 5-[bis(2-chloroethyl)amino]uracil is prepared from the following materials:

| | Gm. |
|---|---|
| 3 - ethoxy - 2 - oxobutyraldehyde bis(thiosemicarbazone) | 250 |
| 5-[bis(2-chloroethyl)amino]uracil | 5 |
| Aluminum monostearate-peanut oil gel, q.s. 10,000 ml. | |

A mixture of two parts aluminum monostearate and 98 parts of peanut oil (parts by weight) is slowly heated with stirring, to 100° C. The mixture is heated at this temperature until gelation is complete (about 1 hr.); and is then heated to 150° C. and maintained at this temperature for 1 hour. The gel is cooled and the 250 gm. of sterile, powdered 3-ethoxy-2-oxobutyraldehyde bis (thiosemicarbazone) and the 5 gm. of sterile, powdered 5-[bis(2-chloroethyl)amino]uracil are aseptically stirred into a volume less than 10,000 ml. The final total volume is adjusted to 10,000 ml. by incorporating additional gel.

EXAMPLE 24.—Sterile aqueous solution

A sterile aqueous solution, suitable for intramuscular injection, intravenous use or vascular perfusion, and containing in each ml. 25 mg. of the disodium salt of 3-ethoxy - 2 - oxobutyraldehyde bis(thiosemicarbazone), is prepared from the following ingredients:

| | |
|---|---|
| Disodium salt of 3-ethoxy-2-oxobutyraldehyde bis thiosemicarbazone) gm | 25 |
| Water for injection, q.s. ml | 1000 |

EXAMPLE 25

Following the procedure of the preceding Examples 15 to 23, inclusive, compositions are similarly prepared substituting an equal amount of one of the following:

3-hydroxy-2-oxobutyraldehyde bis(thiosemicarbazone),
3-hydroxy-2-oxobutyraldehyde bis(thiosemicarbazone)-zinc chelate,
3-hydroxy-2-oxobutyraldehyde bis(thiosemicarbazone)-cuprous chelate,
3-hydroxy-2-oxobutyraldehyde bis(thiosemicarbazone)-cupric chelate,
3-hydroxy-2-oxobutyraldehyde bis(thiosemicarbazone)-auric chelate,
3-methoxy-2-oxobutyraldehyde bis(thiosemicarbazone),
3-methoxy-2-oxobutyraldehyde bis(thiosemicarbazone)-zinc chelate,
3-methoxy-2-oxobutyraldehyde bis(thiosemicarbazone)-cuprous chelate,
3-methoxy-2-oxobutyraldehyde bis(thiosemicarbazone)-cupric chelate,
3-methoxy-2-oxobutyraldehyde bis(thiosemicarbazone)-cobaltous chelate,
3-propoxy-2-oxobutyraldehyde bis(thiosemicarbazone),
3-propoxy-2-oxobutyraldehyde bis(thiosemicarbazone)-zinc chelate,
3-propoxy-2-oxobutyraldehyde bis(thiosemicarbazone)-cuprous chelate,
3-propoxy-2-oxobutyraldehyde bis(thiosemicarbazone)-cupric chelate,
3-propoxy-2-oxobutyraldehyde bis(thiosemicarbazone)-ferrous chelate, 3-isopropoxy-2-oxobutyraldehyde bis(thiosemicarbazone),
3-isopropoxy-2-oxobutyraldehyde bis(thiosemicarbazone)-zinc chelate,
3-isopropoxy-2-oxobutyraldehyde bis(thiosemicarbazone)-cuprous chelate,
3-isopropoxy-2-oxobutyraldehyde bis(thiosemicarbazone)-cupric chelate,
3-isopropoxy-2-oxobutyraldehyde bis(thiosemicarbazone)-cobaltous chelate,
3-acetoxy-2-oxobutyraldehyde bis(thiosemicarbazone),
3-acetoxy-2-oxobutyraldehyde bis(thiosemicarbazone)-zinc chelate,
3-acetoxy-2-oxobutyraldehyde bis(thiosemicarbazone)-cuprous chelate,
3-acetoxy-2-oxobutyraldehyde bis(thiosemicarbazone)-cupric chelate,
3-acetoxy-2-oxobutyraldehyde bis(thiosemicarbazone)-auric chelate,
3-propionoxy-2-oxobutyraldehyde bis(thiosemicarbazone),
3-propionoxy-2-oxobutyraldehyde bis(thiosemicarbazone)-zinc chelate,
3-propionoxy-2-oxobutyraldehyde bis(thiosemicarbazone)-cuprous chelate,
3-propionoxy-2-oxobutyraldehyde bis(thiosemicarbazone)-cupric chelate,
3-propionoxy-2-oxobutyraldehyde bis(thiosemicarbazone)-ferrous chelate,
3-butyryloxy-2-oxobutyraldehyde bis(thiosemicarbazone),
3-butyryloxy-2-oxobutyraldehyde bis(thiosemicarbazone)-zinc chelate,
3-butyryloxy-2-oxobutyraldehyde bis(thiosemicarbazone)-cuprous chelate,
3-butyryloxy-2-oxobutyraldehyde bis(thiosemicarbazone)-cupric chelate,
3-butyryloxy-2-oxobutyraldehyde bis(thiosemicarbazone)-auric chelate, and
3-isobutyryloxy-2-oxobutyraldehyde bis(thiosemicarbazone),
3-isobutyryloxy-2-oxobutyraldehyde bis(thiosemicarbazone)-zinc chelate,
3-isobutyryloxy-2-oxobutyraldehyde bis(thiosemicarbazone)-cuprous chelate,
3-isobutyryloxy-2-oxobutyraldehyde bis(thiosemicarbazone)-cupric chelate,
3-isobutyryloxy-2-oxobutyraldehyde bis(thiosemicarbazone)-nickel chelate for the 3-ethoxy - 2 - oxobutyraldehyde bis(thiosemicarbazone) of the examples.

EXAMPLE 26.—Tablet composition

Ten thousands (10,000) tablets for oral, use each containing 100 mg. of 3-ethoxy-2-oxobutyraldehyde bis(thiosemicarbazone) and 13.6 mg. of cupric chloride was prepared from the following ingredients:

| | Gm. |
|---|---|
| 3 - ethoxy - 2 - oxobutyraldehyde bis(thiosemicarbazone) | 1000 |
| Cupric chloride (CuCl$_2$·2H$_2$O) | 136 |
| Lactose | 1250 |
| Sucrose, powdered | 100 |

The powdered materials were thoroughly mixed and granulated with 10% starch paste. The dry granules were mixed with a lubricant mixture of 100 gm. of bolted starch and 20 gm. of calcium stearate and then compressed into tablets. These tablets are suitable for clinical use, preferably administered at the rate of one tablet daily.

EXAMPLE 27

One thousand capsules are prepared from the following types and amounts of ingredients:

| | Gm. |
|---|---|
| 3 - ethoxy - 2 - oxobutyraldehyde bis(thiosemicarbazone) | 100 |
| Cuprous chloride | 3.6 |
| Cornstarch | 350 |
| Calcium stearate powder | 75 |
| Talc | 75 |

The powdered ingredients are thoroughly mixed and encapsulated in the usual manner.

EXAMPLE 28

One thousand capsules are prepared from the following types and amounts of ingredients:

| | Gm. |
|---|---|
| 3 - ethoxy - 2 - oxobutyraldehyde bis(thiosemicarbazone) | 100 |
| Cupric chloride (CuCl$_2$·2H$_2$O) | 17.18 |
| Cuprous chloride | 7.2 |
| Cornstarch | 350 |
| Calcium stearate powder | 75 |
| Talc | 75 |

The powdered ingredients are thoroughly mixed and encapsulated in the usual manner.

EXAMPLE 29

One thousand capsules are prepared from the following types and amounts of ingredients:

| | Gm. |
|---|---|
| 3 - ethoxy - 2 - oxobutyraldehyde bis(thiosemicarbazone) | 100 |
| Cupric acetate Cu(CH$_3$COO)$_2$·H$_2$O | 7.24 |
| Nickel chloride NiCl$_2$·6H$_2$O | 8.59 |
| Manganese chloride MnCl$_2$·4H$_2$O | 7.24 |
| Cornstarch | 350 |
| Calcium stearate powder | 75 |
| Talc | 75 |

The powdered ingredients are thoroughly mixed and encapsulated in the usual manner.

Following the procedure of the preceding Examples 26 through 29, inclusive, capsules are similarly prepared substituting 100 gm. of 3-methoxy-2-oxobutyraldehyde bis(thiosemicarbazone),
3-hydroxy-2-oxobutyraldehyde bis(thiosemicarbazone),
3-propoxy-2-oxobutyraldehyde bis(thiosemicarbazone),
3-isopropoxy-2-oxobutyraldehyde bis(thiosemicarbazone),
3-acetoxy-2-oxobutyraldehyde bis(thiosemicarbazone),
3-propionoxy-2-oxobutyraldehyde bis(thiosemicarbazone),
3-butyryloxy-2-oxobutyraldehyde bis(thiosemicarbazone), and
3-isobutyryloxy-2-oxobutyraldehyde bis(thiosemicarbazone)

for the 3-ethoxy - 2 - oxobutyraldehyde bis(thiosemicarbazone) of the Examples.

EXAMPLE 30.—Hard-gelatin capsule composition

Ten thousand two-piece hard-gelatin capsules for oral use, each capsule containing 75 mg. of 3-ethoxy-2-oxobutyraldehyde bis(thiosemicarbazone) and 12 mg. of zinc acetate was prepared from the following ingredients:

| | Gm. |
|---|---|
| 3 - ethoxy - 2 - oxobutyraldehyde bis(thiosemicarbazone) | 750 |
| Zinc acetate | 120 |
| Cornstarch | 1600 |
| Light mineral oil | 130 |
| Magnesium stearate, powder | 160 |
| Talc | 160 |

The powdered ingredients were thoroughly mixed and encapsulated in the usual manner. The resulting capsules can be administered clinically at the rate of one capsule daily.

What is claimed is:

1. A compound selected from the group consisting of compounds of the formula:

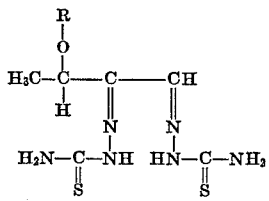

wherein R is a member selected from the group consisting of acetyl, propionyl, butyryl, and isobutyryl; the alkali metal salts thereof; and the acid addition salts thereof with pharmaceutically acceptable acids.

2. A compound of claim 1 wherein said compound is 3-acetoxy-2-oxobutyraldehyde bis(thiosemicarbazone).

3. A compound of claim 1 wherein said compound is 3 - propionoxy - 2 - oxobutyraldehyde bis(thiosemicarbazone).

4. A compound of claim 1 wherein said compound is 3 - butyryloxy - 2 - oxobutyraldehyde bis(thiosemicarbazone).

5. A compound of claim 1 wherein said compound is 3-isobutyryloxy - 2 - oxobutyraldehyde bis(thiosemicarbazone).

References Cited

UNITED STATES PATENTS

| | | | |
|---|---|---|---|
| 3,321,362 | 5/1967 | Lemin | 260—552 X |
| 3,382,275 | 5/1968 | Barrett | 260—552 |

FOREIGN PATENTS 173,701    1953    Austria.

OTHER REFERENCES

French et al., Cancer Research, Vol. 18, pp. 172–5 (1958).

French et al., Cancer Research, Vol. 18, pp. 1290–1300 (1958).

French et al., Cancer Research, Vol. 20, No. 7, pt. 2, pp. 505–9 and 512 (August 1960).

Mihich et al., Cancer Research, Vol. 25, No. 9, p. 1410, October 1965.

JOSEPH E. EVANS, Primary Examiner

M. W. GLYNN, Assistant Examiner

U.S. Cl. X.R.

260—429.9, 430 438.1, 439 R, 501.19, 552 SC, 602; 424—289, 295, 309, 316, 323